Sept. 19, 1939.  A. E. JOHNSON  2,173,419
FRONT WHEEL SPREAD ADJUSTER FOR TRACTORS
Original Filed Feb. 8, 1938   3 Sheets—Sheet 1
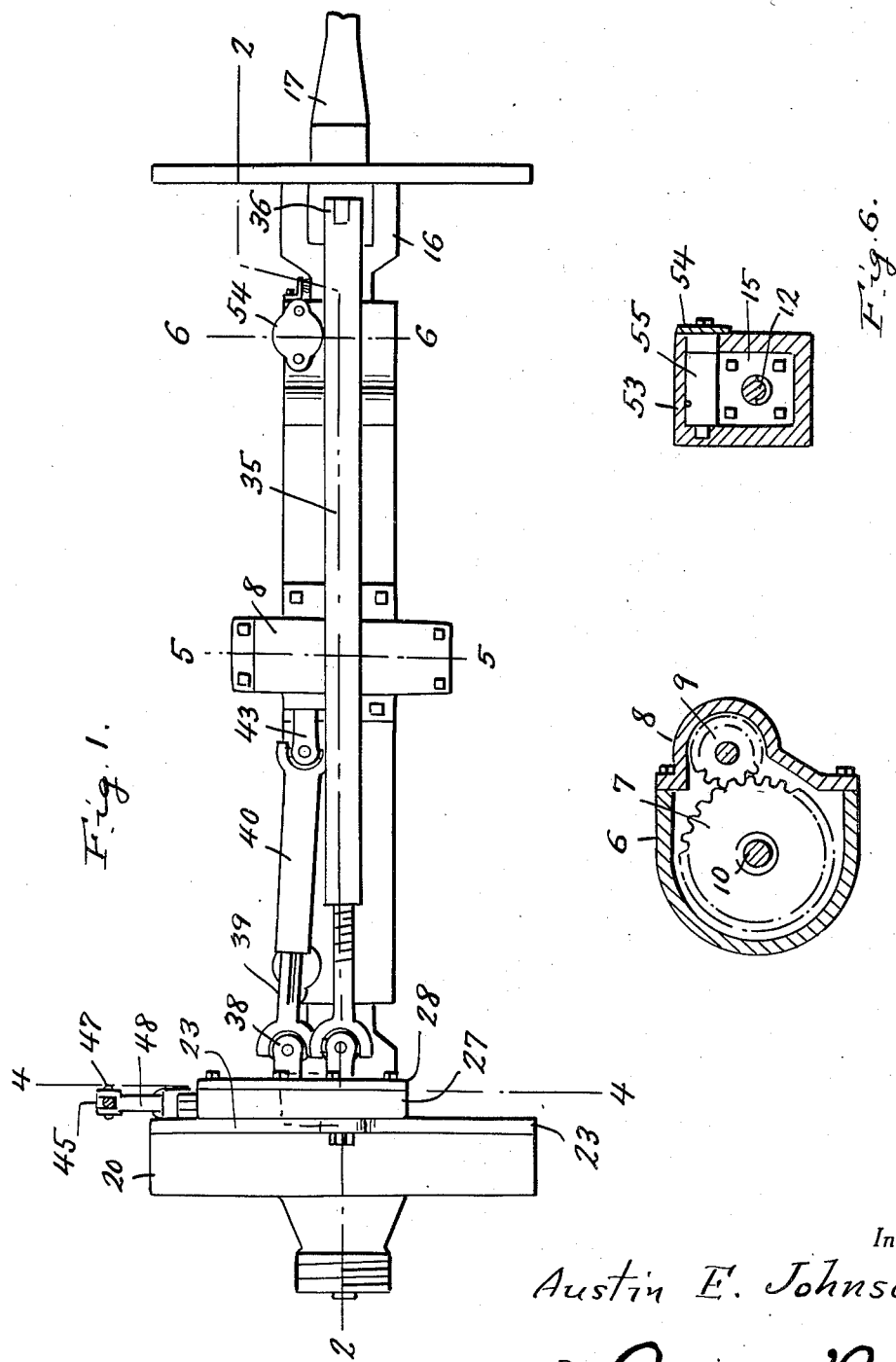
Inventor
Austin E. Johnson
By Clarence A. O'Brien
Hyman Berman
Attorneys Sept. 19, 1939.  A. E. JOHNSON  2,173,419
FRONT WHEEL SPREAD ADJUSTER FOR TRACTORS
Original Filed Feb. 8, 1938   3 Sheets-Sheet 2
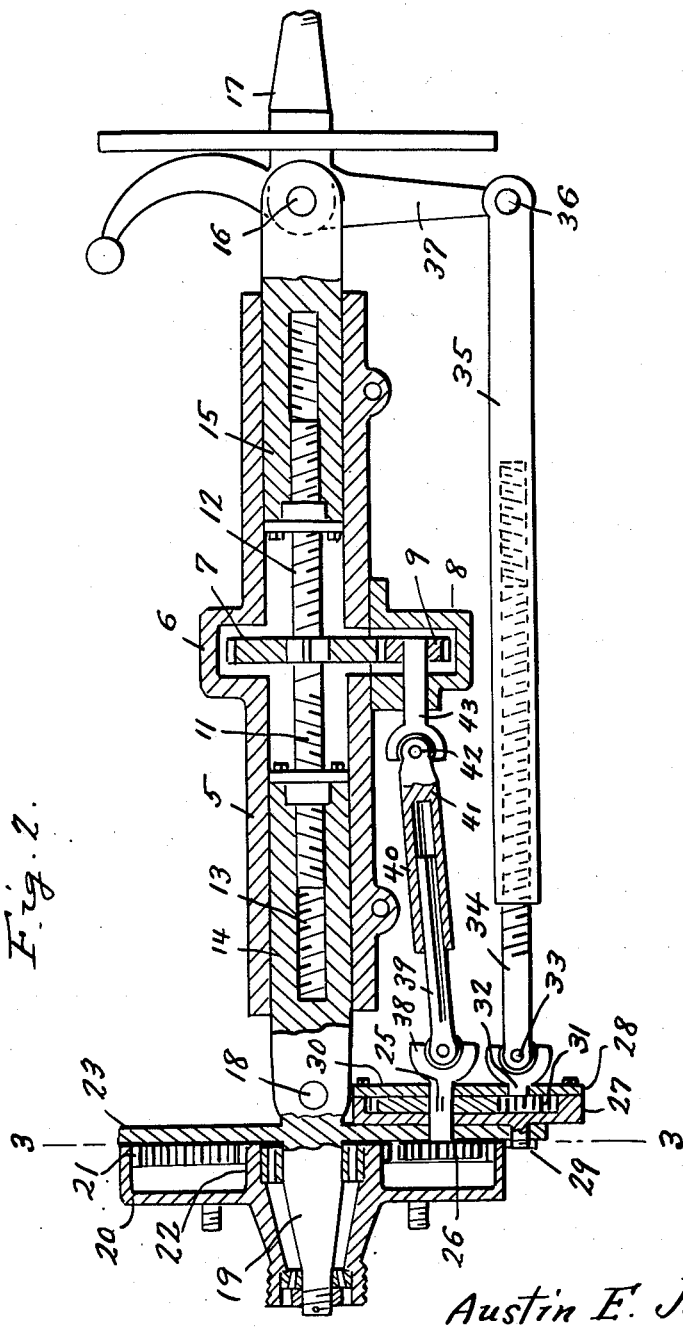
Inventor
Austin E. Johnson
By Clarence A. O'Brien
Hyman Berman
Attorneys Sept. 19, 1939.      A. E. JOHNSON      2,173,419
FRONT WHEEL SPREAD ADJUSTER FOR TRACTORS
Original Filed Feb. 8, 1938      3 Sheets-Sheet 3
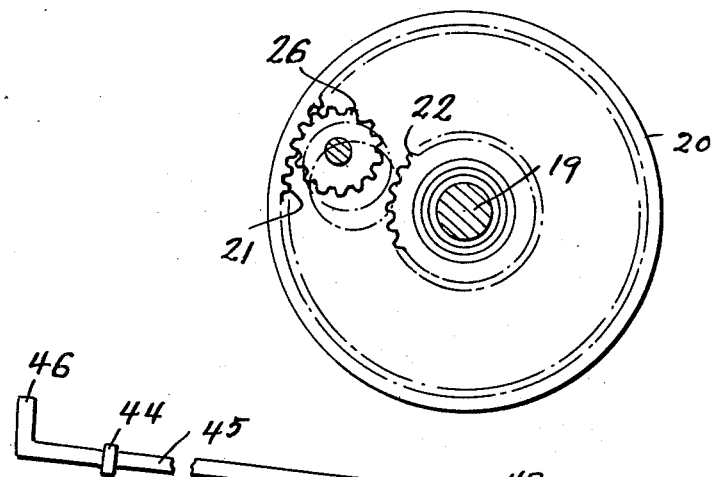
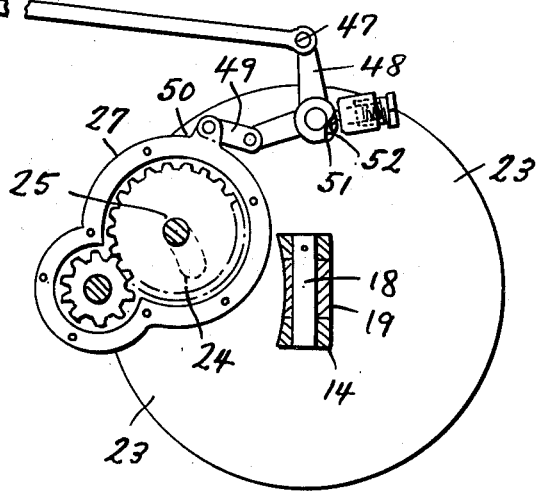
Inventor
Austin E. Johnson
By Clarence A. O'Brien
Hyman Berman
Attorneys Patented Sept. 19, 1939

2,173,419

UNITED STATES PATENT OFFICE 2,173,419

FRONT WHEEL SPREAD ADJUSTER FOR TRACTORS

Austin E. Johnson, Burlington, Colo.

Application February 8, 1938, Serial No. 189,456
Renewed April 12, 1939

2 Claims. (Cl. 280—80)

This invention appertains to new and useful improvements in tractors and more particularly to means for adjusting the separation of the front wheels thereof.

The principal object of the present invention is to provide spread adjusting means for the front wheels of tractors whereby the usual standard thread rubber tire tractor wheels can be adjusted conveniently in spread for row crop farming of listed crops, enabling the tractor to be run on listed ridges without a guide.

Other important objects and advantages of the invention will become apparent to the reader of the following specification.

In the drawings:

Figure 1 represents a rear elevational view.

Figure 2 represents a top plan view with a substantial portion in section and substantially on the line 2—2 of Figure 1.

Figure 3 is a section taken substantially on the line 3—3 of Figure 2.

Figure 4 is a section substantially on the line 4—4 of Figure 1.

Figure 5 is a cross section on the line 5—5 of Figure 1.

Figure 6 is a cross section on the line 6—6 of Figure 1.

Referring to the drawings wherein like numerals designate like parts, it can be seen in Figure 2, that numeral 5 represents an axle made in the form of an elongated barrel preferably of square cross section, having its intermediate portion bulged outwardly as at 6 to accommodate the gear 7 and define an oil box therefor. One side of this oil box 6 is open but normally closed by the section 8 which is in the form of a shell to accommodate the pinion 9 which meshes with the gear 7.

The gear 7 is on the shaft 10 which has right and left hand threaded end portions 11—12, respectively, threadedly disposed into the threaded bores 13 of the axle sections or slide blocks 14—15 which are snugly slidable in the barrel 5. The outer end of the slide block 15 is connected by the usual knuckle connection 16 to the spindle 17 of the right front wheel, while the outer end of the slide block 14 is connected as at 18 to the spindle 19. The wheel which goes on the spindle 19 is of special construction and includes the drum 20 provided with the internal ring gear 21 and the hub portion 22 which is provided with gear teeth concentrically arranged with respect to the ring gear 21. Numeral 23 denotes the plate which serves to close the drum 20 and this is carried by the spindle 19 as shown clearly in Figure 2.

Passing through a slot 24 in the plate 23 is the shaft 25 which at its inner end is provided with the gear 26 meshable with either the gear 21 or the gear 22.

A box-like structure 27 having the closure plate 28 is equipped with the shank 29 which is disposed through an opening in the edge portion of the plate 23 and preferably through a protruding portion of the plate 23 to pivotally connect the box 27 to the plate. This box 27 and its cover 28 has the shaft 25 journaled therethrough and on this shaft within the box 27 is the gear 30 meshing with the pinion 31 on the shank 32 of the universal joint 33 from which extends the threaded rod 34 threadedly disposed into the internally threaded bar 35 which is pivotally connected as at 36 to the steering arm 37 of the knuckle 16.

A universal connection 38 is provided between the shaft 25 and the slide bar 39 which is of polygonal cross-section and this bar is slidably disposed into the socket 40 of the bar 41 which, in turn, is universally connected as at 42 to the shaft 43 which extends into the gear case 8 and carries the pinion 9.

Through suitable guide means 44 the control rod 45 is disposed, the same being provided with a suitable handle 46 adjacent the driver's seat. The other end of the rod 45 is pivotally connected as at 47 to the bellcrank 48, one end of the bellcrank 48 being connected by the pivotal link 49 to the ear 50 on the gear case 27.

A spring projected detent 51 is engageable into any one of three openings 52 in the hub of the bellcrank 48 for retaining the gear 26 either in neutral position between the gears 21—22 or engaged with one or the other.

If the gear 26 is moved by the control 45—46 to engage the gear 22, then the adjusting part shown in Figure 2 will be operated to spread the wheels apart and on the other hand if the gear 26 is moved to engage the gear 21 the wheel adjusting means will be contracted.

Each end of the barrel 5 is provided with a raised portion 53 and an opening at one side thereof having the cover plate 54 so as to accommodate a roller 55 against which the corresponding slide block 14 or 15 is ridable.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An axle assembly of the class described comprising a main axle of hollow construction, a pair of axle sections slidably but non-rotatably arranged in the main axle and projecting from the ends thereof, the inner ends of said axle sections having threaded sockets therein, a screw shaft in the main axle and having right and left threaded parts engaging the sockets, a gear on the shaft, a pinion engaging the gear, a stub shaft journaled in the main axle and carrying the pinion, wheel carrying spindles connected with the outer ends of the axle sections, a wheel hub rotatably arranged on one spindle and including a casing, a ring gear carried by the casing, a gear on the hub concentric with the ring gear, said casing having a slot therein, a stub shaft passing through the slot, a second pinion on the last-mentioned stub shaft, manually operated means for moving the second stub shaft to place the pinion thereon into mesh with either the gear carried by the hub or the ring gear or for moving the stub shaft to place the gear thereof in a neutral position, a telescopic shaft and universal joints connecting the ends of said shaft with the two stub shafts.

2. An axle assembly of the class described comprising a main axle of hollow construction, a pair of axle sections slidably but non-rotatably arranged in the main axle and projecting from the ends thereof, the inner ends of said axle sections having threaded sockets therein, a screw shaft in the main axle and having right and left threaded parts engaging the sockets, a gear on the shaft, a pinion engaging the gear, a stub shaft journaled in the main axle and carrying the pinion, wheel carrying spindles connected with the outer ends of the axle sections, a wheel hub rotatably arranged on one spindle and including a casing, a ring gear carried by the casing, a gear on the hub concentric with the ring gear, said casing having a slot therein, a stub shaft passing through the slot, a second pinion on the last-mentioned stub shaft, manually operated means for moving the second stub shaft to place the pinion thereon into mesh with either the gear carried by the hub or the ring gear or for moving the stub shaft to place the gear thereof in a neutral position, a telescopic shaft and universal joints connecting the ends of said shaft with the two stub shafts, each spindle being pivotally connected with its axle section, an arm on one spindle, a tie rod composed of two sections one having a threaded socket therein and the other section having a threaded portion fitting in the socket, means for connecting one section to the arm, a stub shaft, a universal joint connecting the same with the second section of the tie rod and gearing connecting the last-mentioned stub shaft with the second-mentioned stub shaft.

AUSTIN E. JOHNSON.